(12) United States Patent
Song et al.

(10) Patent No.: US 10,171,402 B2
(45) Date of Patent: Jan. 1, 2019

(54) APPARATUS AND METHOD FOR OUTPUTTING MESSAGE ALERTS

(71) Applicant: Samsung Electronics Co., Ltd., Gyeonggi-do (KR)

(72) Inventors: Myeong-Seok Song, Seoul (KR); Mi-A Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 454 days.

(21) Appl. No.: 14/079,042

(22) Filed: Nov. 13, 2013

(65) Prior Publication Data

US 2014/0310360 A1 Oct. 16, 2014

(30) Foreign Application Priority Data

Apr. 12, 2013 (KR) ........................ 10-2013-0040540

(51) Int. Cl.
*G06F 15/16* (2006.01)
*H04L 12/58* (2006.01)

(52) U.S. Cl.
CPC .................................... *H04L 51/24* (2013.01)

(58) Field of Classification Search
CPC ........................................................ H04L 51/24
USPC .................................. 709/202–207; 455/466
See application file for complete search history.

(56) References Cited

U.S. PATENT DOCUMENTS

| 6,185,288 | B1* | 2/2001 | Wong ...................... H04L 29/06 370/352 |
| 7,233,961 | B2* | 6/2007 | Sampson ........... G06F 17/30067 |
| 8,826,375 | B2* | 9/2014 | Smith ..................... G06Q 10/10 709/201 |
| 8,918,466 | B2* | 12/2014 | Yu ........................... H04L 51/28 709/206 |
| 2004/0183687 | A1* | 9/2004 | Petite ................... G05B 19/042 340/601 |
| 2004/0266389 | A1* | 12/2004 | Kennedy ............ G08B 21/0202 455/404.1 |
| 2006/0123053 | A1* | 6/2006 | Scannell, Jr. ..... G06F 17/30035 |
| 2006/0248183 | A1* | 11/2006 | Barton .................. H04L 12/587 709/224 |
| 2007/0052821 | A1* | 3/2007 | Fukui ................... H04N 5/2354 348/234 |
| 2007/0168519 | A1* | 7/2007 | Hayutin .................. H04L 51/24 709/206 |
| 2008/0114829 | A1* | 5/2008 | Button .................. H04L 67/327 709/203 |
| 2008/0162655 | A1* | 7/2008 | Khedouri .......... G06F 17/30094 709/206 |
| 2009/0191921 | A1* | 7/2009 | Manatrey ............ H04M 19/041 455/567 |
| 2010/0290632 | A1* | 11/2010 | Lin ........................ G01S 3/8006 381/56 |

(Continued)

FOREIGN PATENT DOCUMENTS

KR 10-2006-0096698 A 9/2006

*Primary Examiner* — Bharat Barot
(74) *Attorney, Agent, or Firm* — Cha & Reiter, LLC

(57) ABSTRACT

An apparatus for outputting a message alert is provided, comprising a processor configured to: receive a message; determine whether the message includes an attachment file; and responsive to determining that the message includes the attachment file, output sound contained in the attachment file as a message alert for the message.

10 Claims, 5 Drawing Sheets

(56) References Cited

U.S. PATENT DOCUMENTS

| | | | | |
|---|---|---|---|---|
| 2012/0077518 A1* | 3/2012 | Logan | ............... | G08B 13/1427 |
| | | | | 455/456.1 |
| 2012/0276935 A1* | 11/2012 | Coleman | ............... | H04W 4/14 |
| | | | | 455/466 |
| 2012/0284516 A1* | 11/2012 | Errico | ............... | G06F 21/32 |
| | | | | 713/168 |
| 2013/0031192 A1* | 1/2013 | Caspi | ............... | H04L 65/1069 |
| | | | | 709/206 |
| 2013/0143608 A1* | 6/2013 | Lin | ............... | G06F 17/30705 |
| | | | | 455/466 |
| 2013/0346511 A1* | 12/2013 | Park | ............... | G06Q 10/10 |
| | | | | 709/206 |

\* cited by examiner

APPARATUS AND METHOD FOR OUTPUTTING MESSAGE ALERTS

CLAIM OF PRIORITY

This application claims the priority under 35 U.S.C. § 119(a) to Korean Application Serial No. 10-2013-0040540, which was filed in the Korean Intellectual Property Office on Apr. 12, 2013, the entire content of which is hereby incorporated by reference.

BACKGROUND

1. Field

The present disclosure relates generally to an apparatus and a method for outputting a message alert, and more particularly, to an apparatus and a method, which can output various message alerts.

2. Description of the Related Art

A message alert can be any type of sound, image, or video that is output by a communication terminal when a message is received at that terminal. In some instances, a communication terminal may use different types of message alerts that match various characteristics of messages received at the terminal. An example technique for customizing message alerts includes associating a keyword with a given message alert and, later, when a message is received, analyzing whether the keyword is included in the content of the received message. When the keyword is found to be part of the message, the associated message alert is output, thereby notifying a user of the communication terminal that the message has been received.

In some aspects, however, the aforementioned technique may be inefficient as it requires appropriate keywords to be determined in advance as well as the maintenance of a database of keywords. Accordingly, the need exists for new techniques for outputting of message alerts.

SUMMARY

Accordingly, an aspect of the present disclosure is to provide an apparatus and a method for outputting a message receiving sound, which can output various message receiving sounds according to respective senders of messages and can previously deliver an intention of a sender through a message receiving sound.

In one aspect of the disclosure, an apparatus for outputting a message alert is provided, comprising a processor configured to: receive a message; determine whether the message includes an attachment file; and responsive to determining that the message includes the attachment file, output sound contained in the attachment file as a message alert for the message.

In another aspect of the disclosure, an apparatus for transmitting messages is provided, comprising an input device and a processor, coupled to the input device, configured to: receive, via the input device, a message; output a prompt requesting a user to specify whether the user wishes to use media contained in a file that is attached to the message as a message alert for the message; insert, into the message, an indication of whether the media is to be used as a message alert, the indication being based on a response to the prompt; and transmit the message to a recipient device.

In yet another aspect of the disclosure, a method for outputting a message alert is provided, comprising: receiving a message; determining, by a processor, whether the message includes an attachment file; and responsive to determining that the message includes the attachment file, outputting sound contained in the attachment file as a message alert for the message.

In yet another aspect of the disclosure, a method for transmitting messages is provided, comprising receiving, via an input device, a message; outputting, by a processor, a prompt requesting a user to specify whether the user wishes to use media contained in a file that is attached to the message as a message alert for the message; inserting, into the message, an indication of whether the media is to be used as a message alert, the indication being based on a response to the prompt; and transmitting the message to a recipient device.

BRIEF DESCRIPTION OF THE DRAWINGS

The above and other aspects, features, and advantages of the disclosure will be more apparent from the following detailed description taken in conjunction with the accompanying drawings, in which.

DETAILED DESCRIPTION

Figure 1:
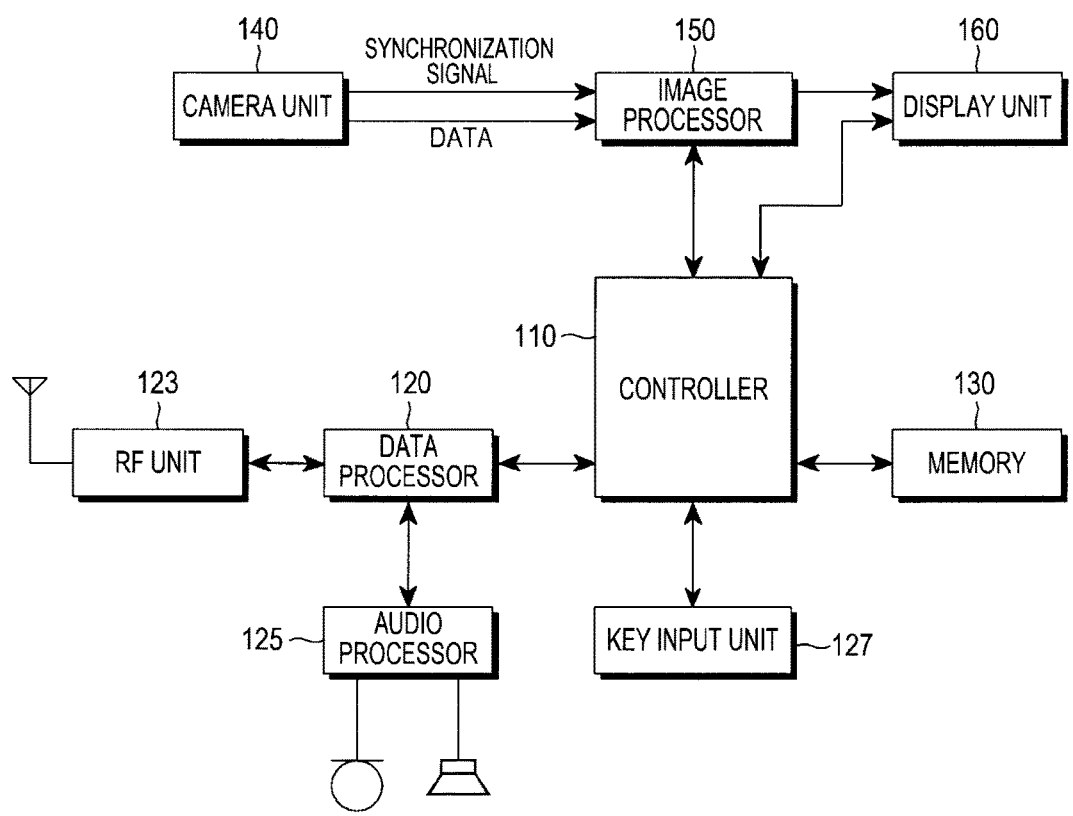
FIG. 1 is a diagram of a terminal according to aspects of the disclosure.

Hereinafter, various aspects of the disclosure will be described with reference to the accompanying drawings. In the following description, the same elements will be designated by the same reference numerals although they are shown in different drawings.

A terminal according to various embodiments of the present invention includes a portable terminal and a fixed terminal. Here, the portable terminal is an easily portable and mobile electronic device, and may include a video phone, a portable phone, a smart phone, a Wideband Code Division Multiple Access (WCDMA) terminal, a Universal Mobile Telecommunication Service (UMTS) terminal, Personal Digital Assistants, a Portable Multimedia Player (PMP), a Digital Multimedia Broadcasting (DMB) terminal, an E-book reader, a portable computer (a notebook computer, a tablet computer, and the like), or a digital camera. Further, the fixed terminal may include a desktop personal computer and/or any other suitable type of device.

Content including sound, in some aspects of the disclosure, may include any type of media content that includes sound, such as a music file, an audio file, a video file, or a voice recording file, a Word file that has sound embedded in it, a Power Point Presentation that has sound embedded in it, and/or any other suitable type of file.

FIG. 1 is a diagram of a portable terminal according to aspects of the disclosure.

Referring to FIG. 1, an RF unit 123 performs a wireless communication function of a portable terminal The RF unit 123 includes an RF transmitter for up-converting and amplifying the frequency of a transmitted signal and an RF receiver for low-noise amplifying and/or down-converting a received signal. A data processor 120 includes a transmitter for encoding and modulating the transmitted signal and a receiver for demodulating and decoding the received signal.

In some aspects, the data processor 120 may be formed of a modem and a codec. The codec may include a data codec for processing packet data, etc. and an audio codec for processing an audio signal, such as voice. An audio processor 125 reproduces a received audio signal output from the audio codec of the data processor 120 or transmits an audio signal generated in a microphone to the audio codec of the data processor 120.

A key input unit 127 includes keys for inputting number and character information and functional keys for setting various functions.

A memory 130 may be formed of a program memory and a data memory. The program memory may store programs for controlling general operations of the portable terminal and programs capable of outputting a sound of contents attached to a received message as an attachment file as a message receiving sound. Further, the data memory serves to temporarily store data generated during the performance of the programs.

A controller 110 performs the general operations of the portable terminal. The controller 110 may include any suitable type of processor, such as an x86 processor, an ARM processor, or an Exynos processor. According to various aspects of the disclosure, content including sound may be attached to a message. Next, the controller 110 may output a prompt asking the user whether he or she wishes sound, that is part of the attached content, to be used as a message alert, at a receiving terminal, to notify the user of the receiving terminal of a receipt of the message. When the user chooses to use the content as a message alert, the controller 110 may include in the message an indication that the content is to be used as a message alert. Afterwards, the controller may transmit the message to the receiving terminal According to the various aspects of the disclosure, when a message is received that includes an attachment file containing audio, the controller 110 may output sound that is part of the attachment file as a message alert for that message. Furthermore, in some instances, prior to outputting the sound as a message alert, the controller 110 may determine whether the message includes an indication that the sound in the attachment file is to be used as a message alert. In such instances, only when the message includes the indication, may the controller 110 output, as a message alert, the sound that is contained in the attachment file. Furthermore, in some instances, when the message includes no attachments that contain audio, the controller may output a default message alert sound.

According to various aspects of the disclosure, the output, as a message alert, of a sound that is contained in an attachment file of the message may depend on an identifier that is associated with the message. The identifier may be the telephone number of the sender of the message, a name of the sender of the message, an email address, an identifier of the terminal used to send the message, and/or any other suitable type of identifier. In some instances, for example, the associated identifier may be one that is contained in the body of the message and/or a header portion of the message. More specifically, in some instances, when a message is received, the controller 110 may determine an identifier associated with the message, compare the identifier with one or more identifiers that are stored in the memory 130, and output as a message alert a sound that is contained in the attachment file, only when the controller 110 determines than the extracted identifier matches at least one of the identifiers stored in the memory 130.

According to various aspects of the disclosure, the output, as a message alert, of a sound that is contained in an attachment file of the message may depend on whether a predetermined keyword is present in the sound. The keyword may be detected by the controller 110 by using voice-to-text recognition. Only when the predetermined keyword is not present, may a sound contained in the attachment file be output as a message alert. In that regard, content that is offensive or otherwise inappropriate may be prevented from being used as a message alert.

According to various aspects of the disclosure, the attachment file may be a video file, a power point presentation, and or any other type of mixed-media content. In such instances, only an audio portion of the content may be played as a message alert, while the rest of the content (e.g., a video or image portion) is not played.

Further, according to aspects of the disclosure, the output, as a message alert, of a sound that is contained in an attachment file of the message may depend on the geolocation of the portable terminal. For example, upon receiving a message, the terminal may use the Global Positioning System (GPS), or another similar service, to identify the terminal's current location. Next, the terminal may compare the current location to one or more locations that are stored in the memory 130. Only if the current location matches at least one of the locations stored in the memory 130, may the terminal output a sound that is contained in an attachment file of the message as a message alert.

Further, according to the various aspects of the disclosure, the output, as a message alert, of a sound that is contained in an attachment file of the message may depend on a time of day when the message is received (or transmitted). For example, the sound may be output as a message alert only during predetermined time periods (e.g., 8:00 a.m. to 7:00 p.m.).

Further, according to aspects of the disclosure, an attachment file that is part of a received message may include an image, an animation, or video. In such instances, the image animation, or video may be output on a display screen of the portable terminal as a visual message alert for the message. In some implementations, the output of the image, animation, or video, may be subject to the same rules as those discussed above with respect to audio message alerts (e.g., the output may be based on time of day, identifier associated with the message, presence of a keyword, etc.).

Further, it should be noted, that any combination of the above rules may be used to determine whether to output audio and/or video attachment as a message alert. Thus, the output, as a message alert, of content that is contained in an attachment file in a message may depend on any combination of: a presence of prohibited keywords, and/or an identifier associated with the message, and/or time of day, and/or geolocation of the receiving terminal.

The duration of the message alert (e.g., 3 seconds), number of repetitions of the message alert, volume of the message alert, treble of the message alert, and/or any other suitable characteristic of the message alert. Thus, for example, when sound that is contained in an attachment file of a message is used as a message alert for that message, only a portion of length specified in the preferences may be played, or the volume at which the sound is played may be adjusted to match a preferred volume specified in the preferences for the presentation of message alerts For example, if the terminal is set to a "Silent" profile, the message may not be played. As another example, if the profile is set to a "Meeting" profile, the message may be played quietly at first volume level. And as yet another example, if the profile is set to a "Normal" profile, the message may be played louder, at a second volume level that is greater than the first volume level.

A camera unit 140 photographs image data, and includes a camera sensor for converting a photographed optical signal to an electric signal and a signal processor for converting an analog image signal photographed by the camera sensor to digital data. Here, it is assumed that the camera sensor is a CCD sensor or a CMOS sensor, and the signal processor may be implemented as a Digital Signal Processor (DSP). Further, the camera sensor may be integrally or separately formed with the signal processor.

An image processor 150 performs Image Signal Processing (ISP) for displaying an image signal output from the camera unit 140 on the display unit 160, and the ISP performs a function, such as gamma correction, interpolation, a spatial change, an image effect, an image scale, Auto White Balance (AWB), Auto Exposure (AE), and Auto Focus (AF). Therefore, the image processor 150 processes an image signal output from the camera unit 140 frame by frame, and outputs the frame image data in accordance with a characteristic and a size of the display unit 160. Further, the image processor 150 includes an image codec, and compresses frame image data displayed on the display unit 160 by a preset scheme or restores the compressed frame image data to original frame image data. Here, the image codec may include a JPEG codec, an MPEG4 codec, a Wavelet codec, etc. It is assumed that the image processor 150 has an On Screen Display (OSD) function and may output OSD data in accordance with a screen size displayed under the control of the controller 110.

The display unit 160 displays an image signal output from the image processor 150 on a screen and displays user data output from the controller 110. Here, the display unit 160 may use an LCD, and in this case, the display unit 160 may include an LCD controller, a memory capable of storing image data, and an LCD display device. Here, when the LCD is implemented by a touch screen scheme, the LCD may serve as an input unit, and in this case, the display unit 160 may display keys, such as the key input unit 127.

Further, in a case where the display unit 160 is used as a touch screen unit according to the implementation of the display unit 160 by the touch screen scheme, the touch screen unit is formed of a Touch Screen Panel (TSP) including a plurality of sensor panels, and the plurality of sensor panels may include an electrostatic sensor panel capable of recognizing a touch of a hand, and an electromagnetic inducing sensor panel capable of sensing a minute touch, such as a touch pen.

An operation of outputting a message receiving sound in the terminal will be described in detail with reference to FIGS. 2 to 5.

Figure 2:
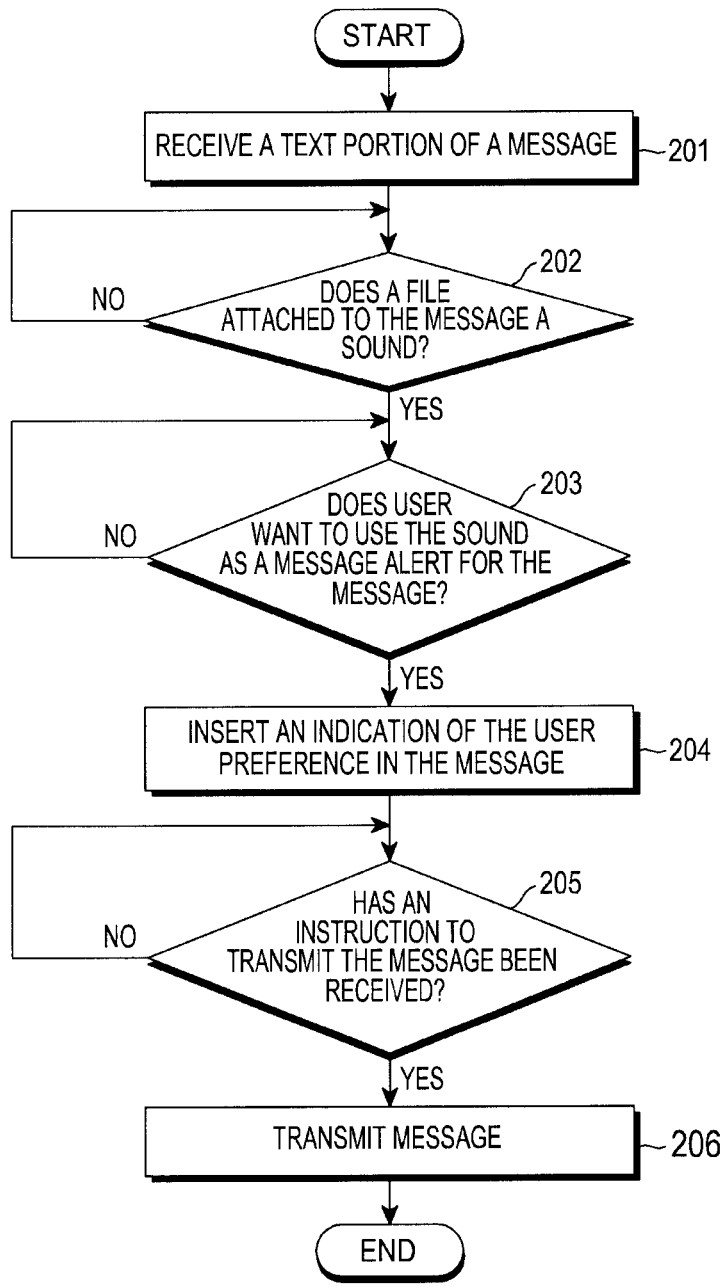
FIG. 2 is a flowchart of a process according to aspects of the disclosure.

FIG. 2 is a flowchart of a process for sending a message according to aspects of the disclosure. In some aspects, the process may be performed by the portable terminal discussed with respect to FIG. 1.

Referring to FIG. 2, at step 201, a text portion of a message is received by the controller 110 from an input device of the terminal (e.g., a keyboard or a touch screen).

At step 202, a determination is made whether the user wishes to attach (or has attached) to the message a file that includes sound. At step 203, in response to determining that the user wishes to attach (or has attached) to the message a file that includes sound, a prompt is displayed by the portable terminal to determine whether the user wishes the sound in the attachment file to be used as a message alert for the message. For example, the prompt may include a graphical (or audio) menu that asks the user to select whether he or she wants to use sound from the attachment file as a message alert.

At step 204, user input is received in response to the prompt that specifies the user's preference with respect to using the sound in the attachment file as a message alert. Afterwards, in some implementations, an indication based on the user preference may be inserted into the message. The indication may be inserted in various places in the message, such as the message's body, a header associated with the message, metadata associated with the message, and/or any other suitable portion of the message. For example, when the user input indicates that the user wishes the sound to be used as a message alert for the message, the indication may indicate that the sound is to be used as a message alert at a recipient device. Additionally or alternatively, as another example, when the user input indicates that the user does not want the sound to be used as a message alert for the message, the indication may accordingly indicate that the sound is not to be used as a message alert at the recipient device.

At step 205, a determination is made whether a user instruction to send the message has been received (e.g., whether the user has pressed a "Send" button). If the instruction is received, the message is transmitted at step 206. The message may be transmitted as an email, a Short Message Service (SMS) message, a Multimedia Messaging Service (MMS) message, and/or any other suitable type of message.

Figure 3:
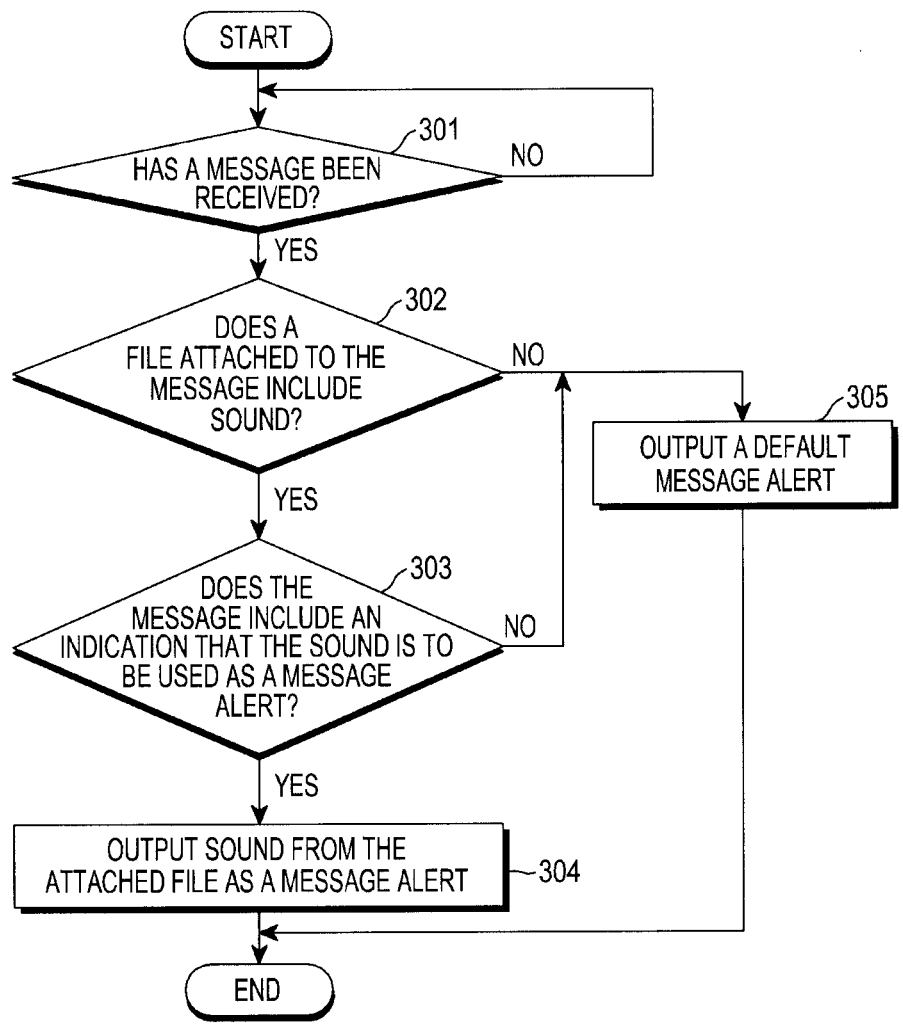
FIG. 3 is a flowchart of another process according to aspects of the disclosure.

FIG. 3 is a flowchart of a process for outputting a message alert according to aspects of the disclosure. In some implementations, the process may be performed by the portable terminal discussed with respect to FIG. 1. Referring to FIG. 3, the controller 110 determines whether a message is received (step 301). When the message is received, the controller 110 determines whether the message includes an attachment file. When the message includes the attachment file, the controller 110 determines whether the attachment file includes sound (step 302). When the attachment file includes sound, the controller determines whether the message contains an indication that sound from the file is to be used as a message alert (step 303). Responsive to determining that the message includes the indication, the controller 110 outputs sound included in the attachment file as a message alert so as to notify the user of the terminal that the message has been received (step 304). Otherwise, when the message does not include an indication to use the sound as a message alert or when the message does not include an attachment file that includes sound, the controller 110 outputs a default message alert (step 305). For example, according to aspects of the disclosure, a birthday greeting message may include "a happy birthday sound" as an attachment, which, upon receipt of the message, may be played at the receiving terminal thus creating a pleasant surprise for the user of the receiving terminal.

Figure 4:
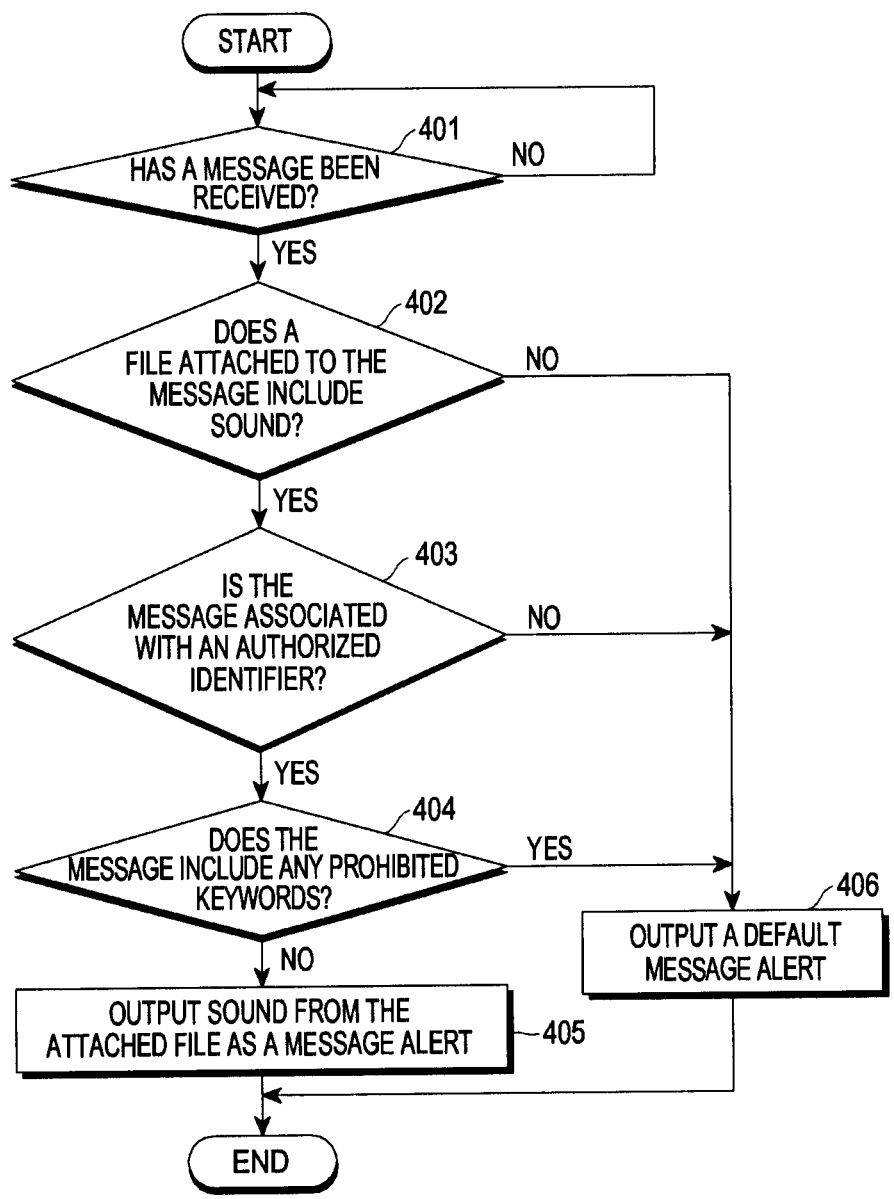
FIG. 4 is a flowchart of yet another process according to aspects of the disclosure.

FIG. 4 depicts a flowchart of a process for outputting a message alert according to aspects of the disclosure. In some implementations, the process may be performed by the portable terminal discussed with respect to FIG. 1.

Referring to FIG. 4, the controller 110 determines whether a message is received at the terminal (step 401). When a message is received, the controller 110 determines whether the message includes an attachment file. When the message includes the attachment file, the controller 110 determines whether the attachment file includes sound (step 402). When the attachment file includes sound, the controller 110 determines whether an identifier associated with the message (e.g., a telephone number of the message's sender) matches one or more identifiers that are stored in the memory 130 (step 403). In some aspects, the one or more identifiers may be obtained from a phone book of the portable terminal (e.g., contacts list) or specified by the user of the portable terminal in advance. Additionally or alternatively, the one or more identifiers may be selected automatically by the controller 110 based on one or more of: frequency of receipt of messages associated with the one or more identifiers, frequency at which the user of the portable terminal opens (e.g., downloads from a server) received messages associated with the one or more identifiers, whether an earlier message associated with the one or more identifiers is received in a predetermined time period (e.g., within five minutes before the message is received at step 401), and/or any other suitable criterion.

Responsive to determining that the identifier associated with the message matches the one or more identifiers stored in the memory 130 (or another storage), the controller 110 determines whether the sound in the attachment file includes utterances of one or more prohibited keywords (step 404). For example, voice-to-text recognition may be used to recognize words that are contained in the attachment file. Any words that are recognized may then be compared to a list of prohibited words that is stored in the memory 130 (or another storage). The list of prohibited keywords may be designated in advance in order to prevent undesirable content from being played aloud.

Responsive to determining that prohibited keywords are not detected, sound from the attachment file is output as a message alert in order to notify the user of the terminal of the receipt of the message (step 405). By contrast, when: the message does not include an attachment file that includes sound, and/or the identifier associated with the message does not match any of the authorized identifiers that are stored in memory 130 (or another storage), and/or the sound in the attachment file includes a prohibited word, the controller 110 plays a default message alert to notify the user of the portable terminal of the receipt of the message (step 406).

Figure 5:
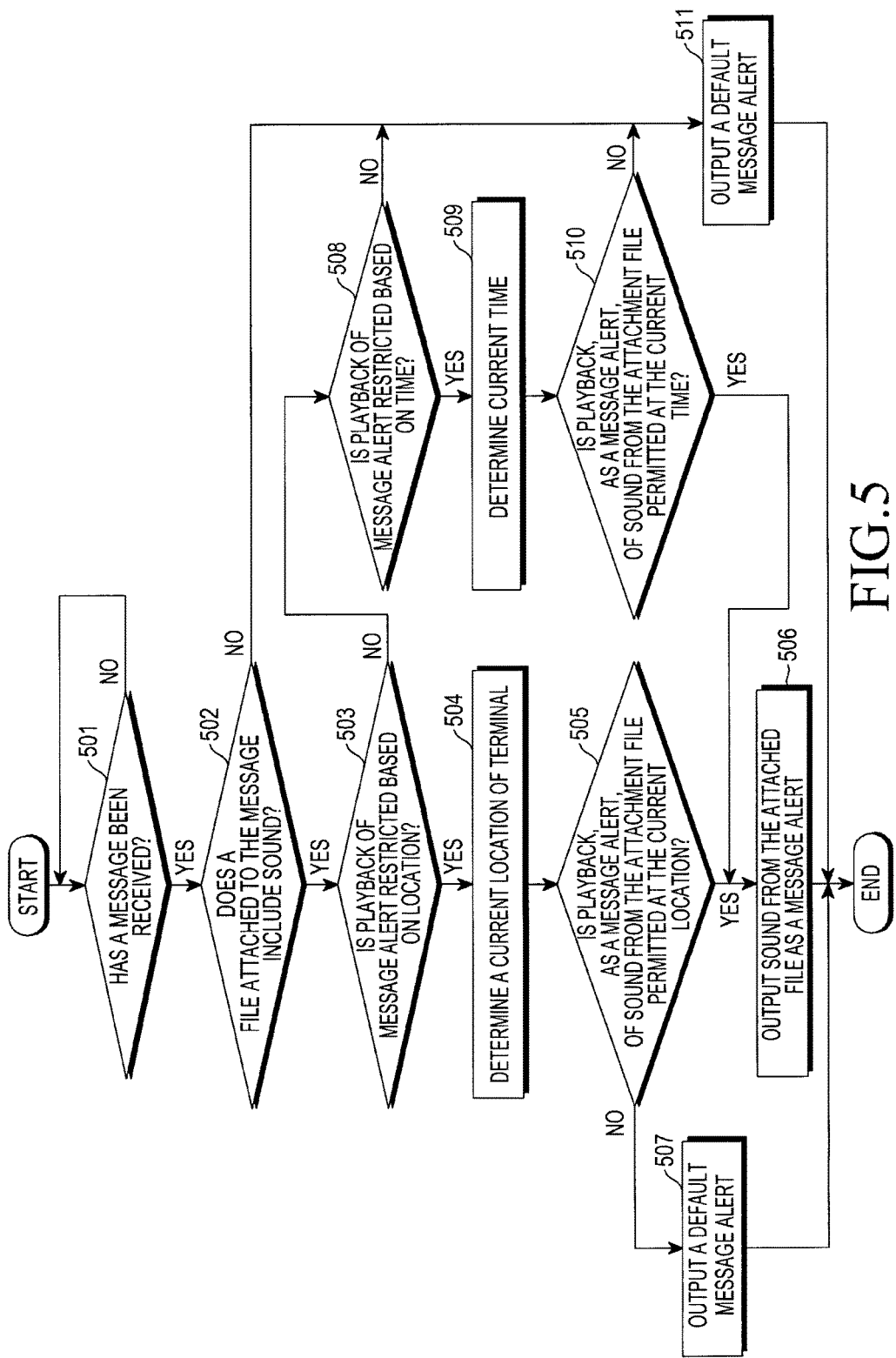
FIG. 5 is a flowchart of yet another process according to aspects of the disclosure.

FIG. 5 is a flowchart of a process for outputting message alerts according to aspects of the disclosure. In some implementations, the process may be performed by the portable terminal discussed with respect to FIG. 1.

Referring to FIG. 5, the controller 110 determines whether a message is received at the terminal (step 501). When a message is received, the controller 110 determines whether the message includes an attachment file. When the message includes an attachment file, the controller 110 determines whether the attachment file includes sound (step 502). When the attachment file includes sound, the controller 110 determines whether the playback, as message alerts, of sounds contained in attachment files is restricted based on location of the portable terminal (step 503). If the playback is restricted, the controller 110 determines a current location of the terminal (step 504). Then, the controller 110 determines whether the current location of the terminal matches one or more locations where playback, as message alerts, of sounds contained in attachment files is permitted (step 505). For example, in some implementations, the controller 110 may determine whether the terminal is located within a threshold distance from a predetermined location (e.g., the user's home). Responsive to the current location matching the one or more locations where playback of sounds contained in attachment files is permitted, the processor 110 may output sound that is contained in the file attached to the message as a message alert for the message (step 506). Otherwise, responsive to finding that the current location of the terminal does not match the one or more locations, the processor 110 may output a default message alert (step 507).

Otherwise, when the playback, as message alerts, of sounds contained in attachment files is not restricted based on location, the controller 110 determines whether the playback, as message alerts, of sound contained in attachment files is restricted based on time (step 508). If the playback is restricted based on time, the controller 110 determines a current time of the day (e.g., time at which the message is received) (step 509). Afterwards, the controller 110 determines whether the current time falls within a predetermined time period (step 510). When the current time falls within the predetermined time period, the controller outputs sound contained in the file that is attached to the message as a message alert for the message (step 506). Otherwise, when the current time falls outside of the predetermined time period, the controller outputs a default message alert (step 511).

For example, a user may configure the portable terminal to use sounds contained in message attachment files only during the period 10:00 a.m. to 5:00 p.m. When such setting is performed, the portable terminal may output, as message alert, sound contained in message attachment files only during that period The process described with respect to FIGS. 2-5 are provided as an example. At least some of the steps in any one of those processes may be performed concurrently or altogether omitted. It is to be understood that the playback, as a message notification, of sound that is contained in an attachment file may, in some instances, include playback of only a portion of all audio contained in the attachment. It is further to be understood that a default message alert may include any type of message alert that is already stored on the portable terminal at the time when a message carrying an attachment file is received. Although the processes described with respect to FIGS. 2-5 involve the playback of audio message alerts, it is to be understood that the in some instances images and/or video that are contained in message attachment files may also be displayed as message alerts in accordance with those processes. The processes may be used in any type of portable or non-portable device.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While aspects of the disclosure have been shown and described with reference to certain implementations thereof, it will be understood by those skilled in the art that various changes in form and details may be made therein without departing from the spirit and scope of the disclosure.

What is claimed is:

1. An apparatus for outputting a message alert, comprising:
 a memory storing an alert sound, a contact and a keyword;
 an audio processor for processing audio information; and
 a processor configured to:
  in response to receiving a message including an attached alert sound, determine whether to output the stored alert sound or an attached alert sound as an alert for the received message, by:
   comparing a sender of the message to the stored contact to determine whether the sender and the stored contact match,
   in response to determining that the sender matches the stored contact, parsing the message including the attached alert sound using a speech-to-text recognition to extract text from at least the attched alert sound, and detecting whether the extracted text includes the stored keyword, and
   in response to determining that the extracted text does not include the stored keyword, outputting the attached alert sound as the alert for the received message using the audio processor.

2. The apparatus of claim 1, wherein the stored alert sound is selected as the alert for the received message in response to one or more of:
 detecting that the received message does not include any attached alert sound;
 detecting that the sender does not match the stored contact; and
 detecting that the extracted text matches the stored keyword.

3. The apparatus of claim 1, wherein determining whether to output the stored alert sound or the attached alert sound further comprises:
 detecting whether the received message includes an indication that the attached alert sound is to be used as the alert for the received message,
 wherein the stored alert sound is selected when the received message does not include any indication, and the attached alert sound is selected when the received message does include the indication.

4. The apparatus of claim 1, wherein the memory further stores a predetermined location, the processor is further configured to:
 detect a current location of the apparatus; and
 detect whether the current location is within a threshold distance from the predetermined location,
 wherein the attached alert sound is selected when the current location is within the threshold distance, and the stored alert sound is selected when the current location is out of the threshold distance.

5. The apparatus of claim 1, wherein memory further stores a predetermined time period, the processor further configured to:
 detect a current time when the message is received; and
 detecting whether the current time is disposed within the predetermined time period,
 wherein the attached alert sound is selected when the current time is disposed within the predetermined time period, and the stored alert sound is selected when the current time is disposed out of the predetermined time period.

6. A method for outputting a message alert, comprising:
 storing in a memory an alert sound, a contact and a keyword;
 processing audio information by an audio processor; and
 in response to receiving a message including and attached alert sound, determining whether to output the stored alert sound or an attached alert sound as an alert for the received message, by:
  comparing a sender of the message to the stored contact to determine whether the sender and the stored contact match,
  in response to determining that the sender matches the stored contact, parsing the message including the attached alert sound using a speech-to-text recognition to extract text from at least the attached alert sound, and detecting whether the extracted text includes the stored keyword, and
  in response to determining that the extracted text does not include the stored keyword, outputting the attached alert sound as the alert for the received message using the audio processor.

7. The method of claim 6, wherein the stored alert sound is selected as the alert for the received message in response to one or more of:
 detecting that the received message does not include any attached alert sound;
 detecting that the sender does not match the stored contact; and
 detecting that the extracted text matches the stored keyword.

8. The method of claim 6, wherein determining whether to output the stored alert sound or the attached alert sound further comprises:
 detecting whether the message includes an indication that the attached alert sound is to be used as the alert for the received message,
 wherein the stored alert sound is selected when the received message does not include any indication, and the attached alert sound is selected when the received message does include the indication.

9. The method of claim 6, further comprising:
 storing a predetermined location in the memory,
 detecting a current location of an electronic device; and
 detecting whether the current location is within a threshold distance from the predetermined location,
 wherein the attached alert sound is selected when the current location is within the threshold distance, and the stored alert sound is selected when the current location is out of the threshold distance.

10. The method of claim 6, further comprising:
 storing a predetermined time period;
 detecting a current time when the message is received; and
 detecting whether the current time is disposed within the predetermined time period,
 wherein the attached alert sound is selected when the current time is disposed within the predetermined time period, and the stored alert sound is selected when the current time is disposed out of the predetermined time period.

* * * * *